United States Patent [19]

Eldert et al.

[11] 3,869,669

[45] Mar. 4, 1975

[54] SYSTEM FOR HIGH FREQUENCY DIGITAL DATA TRANSMISSION

[75] Inventors: Cornelius Eldert, Ypsilanti; Virgilio J. Quiogue, Plymouth, both of Mich.

[73] Assignee: Burroughs Corporation, Detroit, Mich.

[22] Filed: Sept. 4, 1973

[21] Appl. No.: 394,292

[52] U.S. Cl. .................... 325/30, 178/66 R, 178/67

[51] Int. Cl. .......................................... H04l 27/10

[58] Field of Search ............... 178/66 R, 67; 325/30

[56] References Cited

UNITED STATES PATENTS 3,801,911 4/1974 von Hörsten ........................ 325/30

*Primary Examiner*—Malcolm A. Morrison
*Assistant Examiner*—R. Stephen Dildine, Jr.
*Attorney, Agent, or Firm*—Michael B. McMurry; Edwin W. Uren; Edward G. Fiorito

[57] ABSTRACT

A system is disclosed for transmitting digital data at high frequencies which minimizes distortion of the transmitted signal. The system includes an encoding circuit for converting the bit pattern to be transmitted into an improved two-frequency differential signal wherein each bit is represented by at least one full cycle of the differential signal. The differential signal cycle for a zero is comprised of the sum of a bit signal representing a zero and the reciprocal of the bit signal delayed by one fourth of the bit cell and similarly a one is represented by the sum of the bit signal representing a one and the reciprocal of the bit signal also delayed by one fourth of a bit cell. In addition the system includes a receiver circuit for converting the two-frequency differential signal received over a transmission line into a signal directly representing the original bit pattern.

11 Claims, 6 Drawing Figures

SYSTEM FOR HIGH FREQUENCY DIGITAL DATA TRANSMISSION

BACKGROUND OF THE INVENTION

As the high speed transmission of data becomes more prevalent, the requirement for high frequency digital data transmission techniques that are relatively error free have become increasingly important. For example, in large scale computer networks that may contain a number of individual computers where the central processing units may be physically separated by distances of up to 1,500 feet or more, the ability to transfer data between these processors at very high data rates, e.g. 12 to 16 $MH_Z$, becomes essential in providing for an efficient data processing system. In addition there are other applications where a very high rate of data transmission is highly desirable including such areas as data handling systems where it is necessary to transmit large amounts of data from remote data collection terminals to a central processing unit of a computer system.

One very effective technique for transmitting data, as disclosed in U.S. Pat. No. 3,522,539, Levine et al., is the two-frequency or frequency shift key method wherein one complete cycle of the transmitted signal indicates a zero and two complete cyles serves to indicate a one. The advantages of using this two-frequency data transmission method include: symmetry of waveform, minimization of line and receiver offset problems, and good definition of a bit time, or bit cell, since timings are always generated from wavefronts of the same polarity. However, transmitting data using this two-frequency system at high data rates such as 16 $MH_Z$, at the relatively long distance of from 1,000 to 1,500 feet results in a number of problems.

The primary problem encountered arises from the distortion of the transmitted signal in the transmission lines due to the unequal attenuation of each of the two frequencies being transmitted. The difference in attenuation results from a number of factors including: increased skin effect and the particular inductive-capacitive nature of the transmission lines at high frequencies.

SUMMARY OF THE INVENTION

It is accordingly an important object of the invention to provide a means of transmitting data at high data rates over relatively long distances that will minimize distortions of the transmitted signals.

It is an additional object of the invention to provide an efficient means of encoding and decoding the data signal that is to be transmitted.

In order to reduce the signal distortions due to unequal attenuation in the two-frequency data transmission technique, a method of data transmission has been developed that utilizes an improved two-frequency differential signal. First a bit signal is generated from a bit pattern wherein a one is represented by two cycles of the bit signal and a zero is represented by one cycle. Then the bit signal is in effect delayed by one-fourth of a bit cell (or bit time). At this point each zero portion of the original bit signal and the corresponding reciprocal of the delayed bit signal for each corresponding zero portion are summed to form a differential signal. The one portion of the differential signal is likewise formed by taking each one portion of the bit signal (which is twice the frequency of the zero portion of the bit signal) and summing the original bit signal and the corresponding one portion of the bit signal delayed by one-fourth of a bit cell.

An encoding circuit is provided for converting the bit pattern that is to be transmitted into the improved differential signal that will be actually applied to the transmission line. The encoding circuit converts a bit pattern into the differential signal where a zero is represented by at least one full cycle of the improved differential signal and a one is represented by a portion of the differential signal that is a multiple of the frequency of the zero.

The data transmission system also includes a receiver circuit for converting the differential signal into a signal that represents the original bit pattern.

By using this delay technique in generating a differential signal, the fundamental frequency of a zero remains half of that of a one, but the capacitive effects of the transmission line are reduced significantly. It is this reduction in the capacitive effects that tends to reduce attenuation difference between the two frequencies of the different signal.

DETAILED DESCRIPTION OF THE INVENTION

Figure 1:
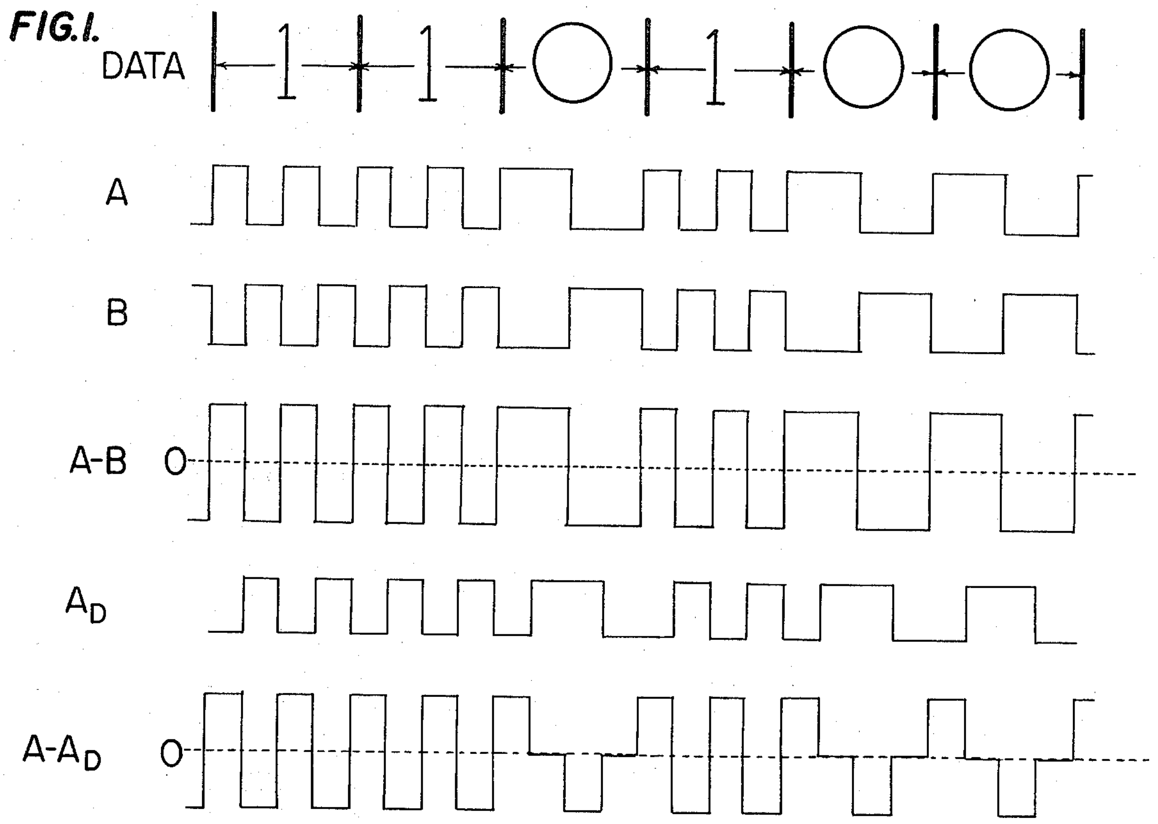
FIG. 1 is a graph illustrating the waveforms of the bit signal and the differential signal.

In FIG. 1 is illustrated in line A–B a standard two-frequency differential signal, similar to that as taught by U.S. Pat. No. 3,522,539, which is frequently used for transmitting data. This signal is composed of a bit signal, line A, wherein a one is represented by two cycles of a squarewave and the zero is represented by one cycle of a squarewave over a bit cell (the predetermined time for the transmission of one bit). The two-frequency differential signal in line A–B is comprised of the bit signal of line A and the reciprocal of the bit signal, line B.

Figure 4:
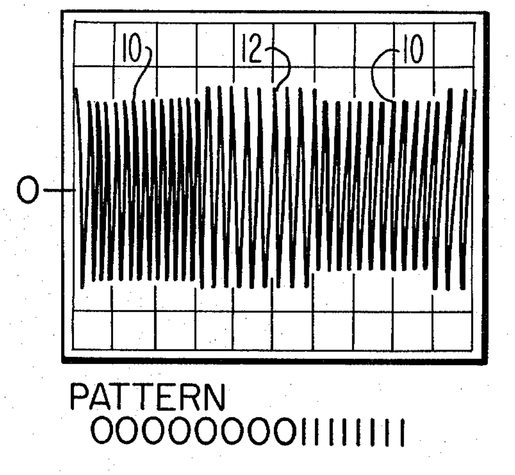
FIG. 4 is a graph illustrating the input to a transmission line of a two-frequency standard signal.
Figure 5:
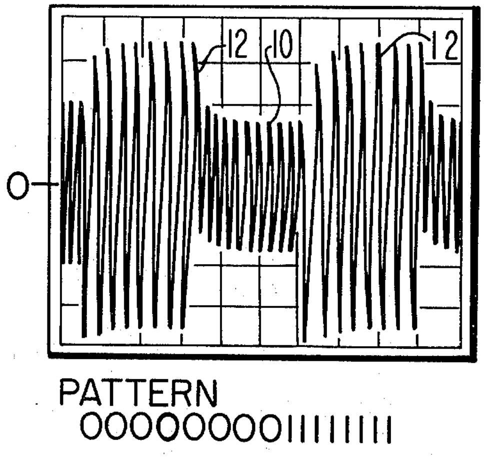
FIG. 5 is a graph illustrating the output from a transmission line of a standard two-frequency signal.

An example of the effects of a transmission line on the standard two-frequency signal, as shown in line A–B of FIG. 1, when transmitted at a frequency of approximately 14 $MH_Z$ for zeros, and therefore an effective frequency of 28 $MH_Z$ for ones over a transmission line of 1,000 feet in length is shown in FIG. 5. The input signal to the line is illustrated in the graph of FIG. 4 for a pattern consisting of eight zeros followed by eight ones. This may be compared to the output of the transmission line illustrated in FIG. 5 for the same pattern. As can be seen from the graph in FIG. 5, the attenuation of the ones shown at 10 is much greater than the attenuation of the zeros 12.

In order to overcome these attenuation effects, which makes decoding of the signals difficult and subject to error, the waveform as shown in line A–$A_D$ of FIG. 1 was developed. This waveform is the summation of the bit signal A and the bit signal A delayed by one-fourth of a bit cell, line $A_D$ of FIG. 1, that has been inverted. The combination of the bit signal A and the reciprocal of the delayed bit signal $A_D$ gives the improved two-frequency differential signal $A–A_D$.

Figure 6:
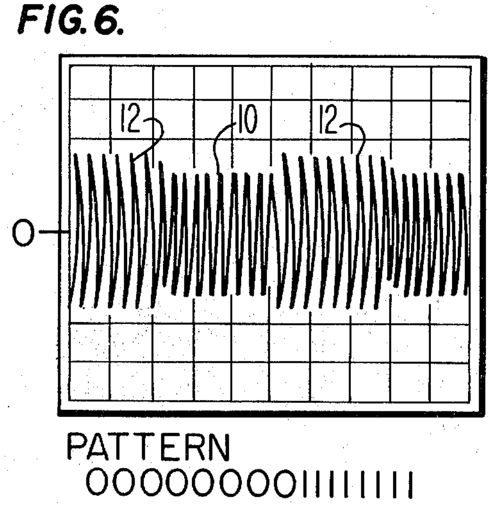
FIG. 6 is a graph illustrating the output from a transmission line of the improved differential signal.

The effect of the transmission characteristics of the improved differential signal $A–A_D$ can be seen in the graph of FIG. 6. Here the degree of attenuation of the ones 10 is much closer to the attenuation of the zeros 12 than is the case in the standard two-frequency differential signal A–B as shown in FIG. 5.

Figure 2:
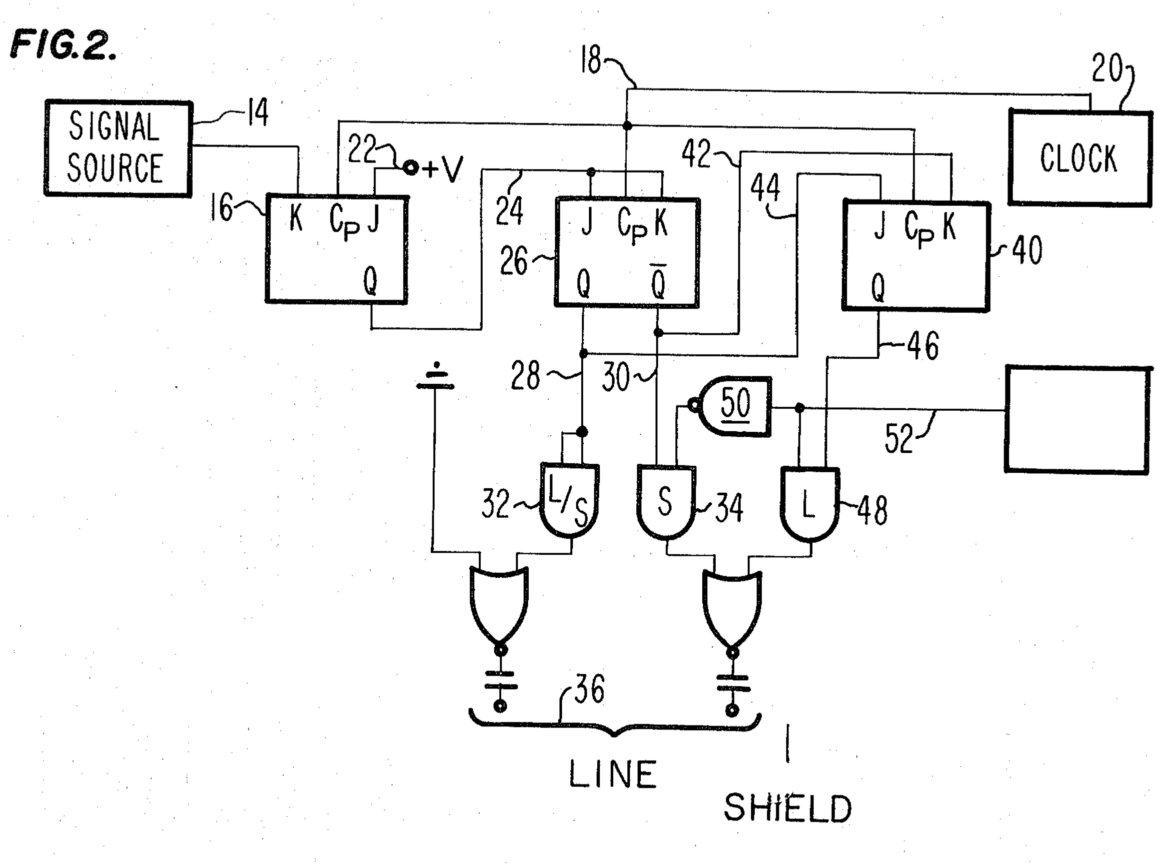
FIG. 2 is a schematic of the encoding circuit.

The preferred embodiment of an encoding circuit for converting a bit pattern into the improved differential signal $A–A_D$ is illustrated in FIG. 2. The bit pattern to be encoded is received on line 14 and is used as input to the first flip flop 16. The J-K flip flop 16 is triggered by a signal received over line 18 from a clock 20 wherein for purposes of the preferred embodiment the clock frequency is 57.2 $MH_Z$. The first flip flop 16 will also have a constant voltage 22 applied to its J terminal. The output from the Q terminal of the flip flop 16 is then transmitted over line 24 and is used as input to both the J and the K terminals of the second J-K flip flop 26. The second flip flop 26 is also triggered by the clock source 20. The effect of inputting a bit pattern on line 14, wherein a zero will be a high signal or positive voltage and a one is a low signal or low voltage, will be to produce the waveform as shown in line A of FIG. on the Q terminal of the second flip flop 26 and the waveform shown in line B of FIG. 1 on the $\overline{Q}$ terminal of flip flop 26. The output of the flip flop 26 is then transmitted on lines 28 and 30 through the AND gates 32 and 34 of the interface circuitry to the input terminals of the transmission line 36. In this way the standard waveform A–B of FIG. 1 can be produced on the line 36.

However, in the preferred embodiment of the invention, when it is desired to transmit data over longer distances, the remaining circuitry shown in FIG. 2 may be used to create the improved differential signal waveform $A–A_D$ of FIG. 1. This is accomplished by using the third J-K flip flop 40 receive as input to its J and K terminals, the Q and $\overline{Q}$ output of the second flip flop 26 over lines 42 and 44. The third flip flop 40 is also triggered by the clock 20. The signal generated on the Q terminal of the third flip flop 40 and hence on line 46 will be equivalent to the waveform $A_D$ of FIG. 1. This signal when transmitted through gate 48 to the line 36 will combine in the interface circuitry with the signal transmitted on line 28 from the Q terminal of flip flop 26 to create the improved differential signal waveform $A–A_D$ on the transmission line 36.

The purpose of the gate 50 as shown in the interface circuitry of FIG. 2 is to permit the encoding circuitry shown in FIG. 2 to switch between producing the waveform A–B of FIG. 1 which is suitable for shorter distance data transmission and the production of the improved waveform $A–A_D$ of FIG. 1 which is suitable for data transmission over longer distances. The inclusion of this circuitry permits the automatic selection of the more appropriate waveform for transmission. Responding to a positive signal, over line 52, the gate 48 will be enabled so as to transmit the output of terminal Q of the third flip flop 40 through the OR gate 34 to the transmission line 36. At the same time the positive signal on line 52, operating through the inverting gate 50, will turn off the AND gate 34 thereby cutting off the output of the $\overline{Q}$ terminal of the second flip flop 26 from the transmission line 36. By the same token, a low signal on line 52 indicating a short distance transmission line, will enable the gate 34 and turn off the gate 48 thus permitting the A–B type signal to be transmitted over the line 36.

The transmission line 36 used in the preferred embodiment is a balanced-pair transmission line having a low capacitance factor per foot and with a characteristic impedance of 100 ohms so as to make it compatible with the driving capacity of integrated circuits.

Figure 3:
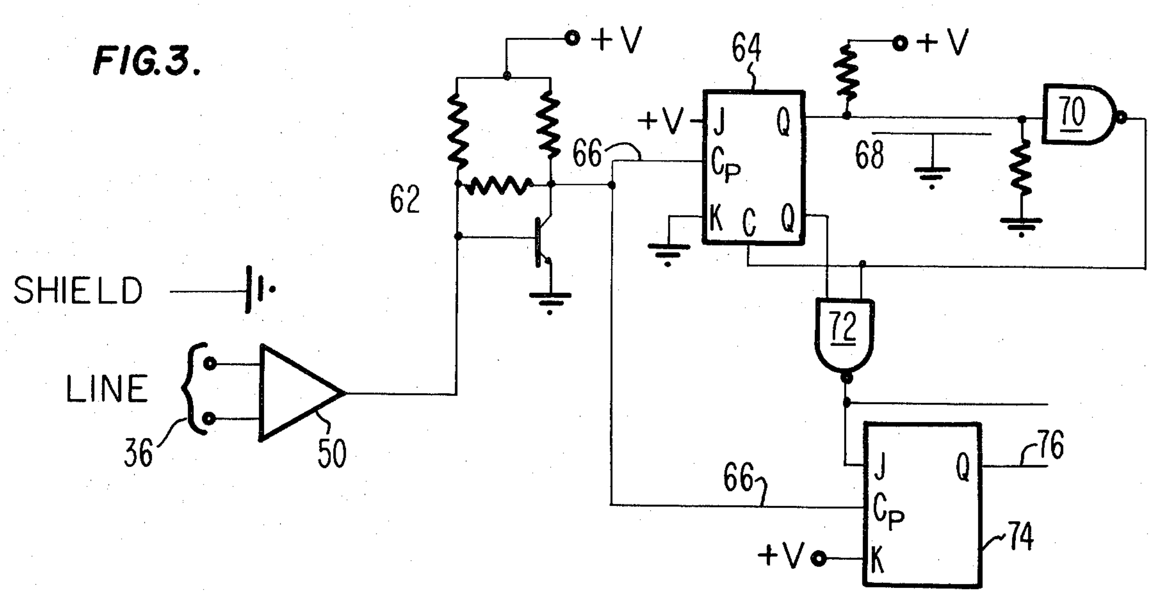
FIG. 3 is a schematic of the receiving circuit.

In the circuit diagram as set forth in FIG. 3 is illustrated the preferred embodiment for a receiver circuit. The function of this circuit is to take the differential signal as recieved from the transmission line 36 and convert it to a signal representing the orginal bit pattern. The circuit illustrated in FIG. 3 functions essentially by counting the number of wavefronts of the differential signal over a single bit cell or bit time. It will also be noted that the circuitry as set forth in FIG. 3 can decode both the differential signal A–B of FIG. 1 and the improved differential signal $A–A_D$.

The transmitted signal is received from line 36 by the differential amplifier 50. This signal is further amplified and shaped by the amplifier 62 and then is applied over line 66 as input to the trigger terminal $C_p$ of the first J-K flip flop 64. The Q output of the flip flop 64 is used as input into a delay line 68 which will delay the signal for three-eighths of a bit cell. It hould be noted here that a wide variety of delay elements could be used for the delay line 68 including delay multivibrators. The delayed signal is then inverted by the gate 70 and the inverted signal is used as an input to both the gate 72 and the clearing switch C of the first flip flop 64. The other input to the gate 72 is the $\overline{Q}$ output of the first flip flop 64. The resulting signal as output by the gate 72 will have the duration of three-fourths of a bit cell. This clock signal, three-fourths of a bit cell, is then used as the J input to the second flip flop 74. Also used as the input to the second flip flop 74 is the transmitted signal on line 66 that is connected to the terminal $C_p$ in order to trigger the flip flop. The combination of these two input to the flip flop 74 will result in this flip flop, the effect, counting the number of wavefronts received within each single bit cell time. For example if a one is being transmitted or received, there will be two wavefronts on line 66 within one bit cell time and therefore produce two trigger signals on the flip flop 74. This will cause the output Q of the flip flop 74 to go to one half way through the bit cell time. Similarly, if a zero is being transmitted only one wavefront will be transmitted over line 66 during the bit cell and as a result the flip flop 74 will remain zero on output 76 at the beginning of the bit cell. In this manner the differential waveform of the transmitted signal will be decoded by the circuitry of FIG. 3. It will be appreciated that the results of this decoding are independent of the fact of whether the transmitted signal is in the differential waveform A-B or in the improved waveform $A–A_D$ of FIG. 1.

Even though the preferred embodiment of the invention is directed towards generating and decoding an improved differential signal having a portion thereof delayed by one-fourth of a bit cell, it will be understood that other signals that have improved transmission characteristics at high frequencies will fall within the scope of the applicants' invention.

What is claimed is:

1. A high frequency digital data transmission system comprising:

encoding means for converting a bit pattern into an improved two-frequency differential signal wherein each bit state is represented by at least one full cycle of said differential signal said differential signal cycle comprised of the sum of a bit signal and the reciprocal of said bit signal delayed by a predetermined portion of the cycle time said encoding means comprising:

a clock for generating clock pulses;

a first flip flop responsive to the bit pattern and said clock;

a second flip flop responsive to said first flip flop for producing a bit signal;

a third flip flop responsive to said second flip flop for producing a delayed bit signal;

interface means to apply the combination of said bit signal and the reciprocal of said delayed bit signal to said transmission means thereby forming said improved differential signal;

a transmission means for transmitting said differential signal; and receiver means responsive to said transmission means for converting said differential signal into a signal representing said bit pattern.

2. The high frequency digital data transmission system of claim 1 wherein said interface means further includes gating means for switching between a standard two-frequency differential signal and said improved two-frequency differential signal.

3. The high frequency digital data transmission system comprising:

encoding means for converting a bit pattern into an improved two-frequency differential signal wherein each bit state is represented by at least one full cycle of said differential signal said differential signal cycle comprised of the sum of a bit signal and the reciprocal of said bit signal delayed by a predetermined portion of the cycle time;

a transmission means for transmitting said differential signal;

receiver means responsive to said transmission means for converting said differential signal into a signal pattern comprising:

a first flip flop for receiving the differential signal from said transmission means;

a delay element;

a gating element for combining the output signal of said first flip flop and the output signal of said delay element; and a second flip flop responsive to the differential signal and the output signal of said gating element for producing a signal representative of the bit pattern.

4. The high frequency digital data transmission system of claim 3 wherein said delay element includes a delay multivibrator for delaying the output of said first flip flop a predetermined proportion of a bit cell.

5. The high frequency digital data transmission system of claim 3 wherein said delay element includes elements for delaying the output of said first flip flop by three-eighths of a bit cell.

6. The high frequency digital data transmission system comprising:

encoding means for converting a bit pattern into an improved two-frequency differential signal wherein each bit state is represented by at least one full cycle of said differential signal, said differential signal comprised of the sum of a bit signal and the reciprocal of said bit signal delayed by one fourth of a bit cell;

transmission means for transmitting said differential signal;

receiver means responsive to said transmission means for converting said differential signal into a signal representing said bit pattern;

a first flip flop for receiving said differential signal from said transmission means;

a delay circuit element;

a gating element for combining the output of said first flip flop and the output of said delay circuit element; and a second flip flop responsive to said differential signal and the output of said gating element.

7. The high frequency digital data transmission system of claim 6 wherein said delay circuit element includes delay circuitry for delaying the output of said first flip flop three-eighths of a bit cell.

8. A high frequency digital data transmission system for transmitting an improved two-frequency differential signal comprising:

clock means for generating a high frequency clock signal;

a first flip flop responsive to a bit pattern and said clock means;

a second flip flop responsive to said first flip flop for producing a bit signal;

a third flip flop responsive to said second flip flop for producing a second bit signal delayed by a predetermined proportion of a bit cell;

transmission means for receiving the output of said second flip flop and said third flip flop for transmitting the resultant differential signal;

a first receive flip flop for receiving said differential signal from said transmission means;

a delay circuit element including delay circuit elements for delaying the output of said first receive flip flop by a predetermined portion of a bit cell;

a gating element for combining the output of said first receive flip flop and the output of said delay circuit element; and a second receive flip flop responsive to said differential signal and the output of said gating elements effective to reproduce the bit pattern.

9. A high frequency digital data transmission system for encoding and receiving an improved differential signal comprising:

encoding means for converting a bit pattern into an improved two-frequency differential signal wherein each bit state is represented by at least one full cycle of said differential signal, said differential signal comprised of the sum of a bit signal and the reciprocal of said bit signal delayed by one fourth of a bit cell said encoding means comprising:

clock means for generating high frequency clock pulses;

a first flip flop responsive to the bit pattern and said clock means;

a second flip flop responsive to said first flip flop for producing said bit signal;

a third flip flop responsive to said second flip flop for producing said bit signal delayed by one fourth of a bit cell;

interface circuitry to apply the combination of said bit signal and the reciprocal of said delayed bit signal to said transmission means;

transmission means for transmitting said differential signal; and receiver means responsive to said transmission means for converting said differential signal into a signal representing said bit pattern.

10. The high frequency digital data transmission system of claim 9 wherein said transmission means includes a balanced pair transmission line.

11. The high frequency digital data transmission system of claim 9 wherein said interface circuitry further includes a gating circuit for switching between a standard two-frequency differential signal and said improved two-frequency differential signal.

* * * * *